United States Patent
Sakamoto et al.

(10) Patent No.: US 11,719,493 B2
(45) Date of Patent: Aug. 8, 2023

(54) COOLER

(71) Applicants: TOYOTA JIDOSHA KABUSHIKI KAISHA, Toyota (JP); SUBARU CORPORATION, Tokyo (JP)

(72) Inventors: Hironobu Sakamoto, Okazaki (JP); Yoshihiro Ishihara, Shibuya-ku (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 5 days.

(21) Appl. No.: 17/145,950

(22) Filed: Jan. 11, 2021

(65) Prior Publication Data

US 2021/0270543 A1  Sep. 2, 2021

(30) Foreign Application Priority Data

Feb. 28, 2020 (JP) ................. 2020-033990

(51) Int. Cl.
*F28F 1/00* (2006.01)
*H01M 10/613* (2014.01)

(52) U.S. Cl.
CPC ........... *F28F 1/006* (2013.01); *H01M 10/613* (2015.04); *F28F 2210/02* (2013.01); *F28F 2210/10* (2013.01)

(58) Field of Classification Search
CPC .... F28F 1/006; F28F 2210/02; F28F 2210/10; F28F 2210/08; H01M 10/613
USPC ....................................................... 165/177
See application file for complete search history.

(56) References Cited

U.S. PATENT DOCUMENTS

| | | | | |
|---|---|---|---|---|
| 754,969 A | * | 3/1904 | Burt ................. | H01M 10/6565 |
| | | | | 429/120 |
| 3,205,939 A | * | 9/1965 | Huet ....................... | F22B 1/16 |
| | | | | 976/DIG. 198 |
| 4,038,970 A | * | 8/1977 | D'Ascoli ............... | F24S 10/504 |
| | | | | 126/584 |
| 4,478,277 A | * | 10/1984 | Friedman ............ | H01M 10/613 |
| | | | | 165/47 |
| 4,574,876 A | * | 3/1986 | Aid ....................... | A61M 1/166 |
| | | | | 165/917 |

(Continued)

FOREIGN PATENT DOCUMENTS

| JP | 2007-266463 A | 10/2007 |
|---|---|---|
| JP | 2012-195209 A | 10/2012 |

(Continued)

*Primary Examiner* — Tho V Duong
*Assistant Examiner* — Raheena R Malik
(74) *Attorney, Agent, or Firm* — Oliff PLC

(57) ABSTRACT

The present disclosure provides a technique related to a cooler including a main channel in which an object to be cooled is attached to an upper surface thereof, and a structure which prevents air bubbles from entering the main channel. A cooler for cooling an object may include: a main channel in which coolant flows, wherein the object is attached to an upper surface of the main channel; and a sub channel bypassing the main channel, wherein a ceiling of the sub channel is higher than a ceiling of the main channel at a branch point between the main channel and the sub channel. Air bubbles trapped in the coolant flow into the sub channel having a higher ceiling height, thus they do not enter the main channel.

4 Claims, 4 Drawing Sheets

(56) References Cited

U.S. PATENT DOCUMENTS

| | | | | |
|---|---|---|---|---|
| 5,388,635 A * | 2/1995 | Gruber | | F28F 3/12 |
| | | | | 257/E23.09 |
| 5,763,950 A * | 6/1998 | Fujisaki | | H01L 23/3672 |
| | | | | 257/E29.022 |
| 6,422,027 B1 * | 7/2002 | Coates, Jr. | | H01M 10/617 |
| | | | | 62/185 |
| 6,637,463 B1 * | 10/2003 | Lei | | B01L 13/02 |
| | | | | 137/841 |
| 6,997,246 B2 * | 2/2006 | Visser | | F28F 1/405 |
| | | | | 165/177 |
| 7,007,504 B2 * | 3/2006 | Kang | | F28D 1/0477 |
| | | | | 29/890.038 |
| 7,571,759 B2 * | 8/2009 | Inagaki | | F28D 1/0325 |
| | | | | 165/80.4 |
| 8,037,927 B2 * | 10/2011 | Schuette | | F28F 3/06 |
| | | | | 165/80.4 |
| 9,666,912 B2 * | 5/2017 | Obrist | | H01M 10/613 |
| 2006/0144565 A1 * | 7/2006 | Tsai | | F28D 15/025 |
| | | | | 165/104.33 |
| 2013/0244077 A1 * | 9/2013 | Palanchon | | H01M 10/61 |
| | | | | 429/120 |
| 2014/0162107 A1 * | 6/2014 | Obrist | | H01M 10/617 |
| | | | | 165/46 |
| 2018/0205125 A1 * | 7/2018 | Burgers | | H01M 10/6556 |
| 2018/0248239 A1 * | 8/2018 | Nam | | H01M 10/6557 |
| 2018/0277150 A1 * | 9/2018 | Kikuchi | | G11B 5/40 |
| 2018/0358672 A1 * | 12/2018 | Schmitt | | H01M 10/613 |
| 2021/0270543 A1 * | 9/2021 | Sakamoto | | H01M 10/6567 |
| 2022/0069384 A1 * | 3/2022 | Choi | | H01M 10/625 |

FOREIGN PATENT DOCUMENTS

| | | |
|---|---|---|
| JP | 2018-163714 A | 10/2018 |
| JP | 2019-046944 A | 3/2019 |

* cited by examiner

COOLER

CROSS-REFERENCE TO RELATED APPLICATION

This application claims priority to Japanese Patent Application No. 2020-033990 filed on Feb. 28, 2020, the contents of which are hereby incorporated by reference into the present application.

TECHNICAL FIELD

The technique disclosed herein relates to a cooler in which an object to be cooled is attached to an upper surface thereof.

BACKGROUND

A cooler in which an object to be cooled is attached to an upper surface thereof is known. For example, Japanese Patent Application Publication No. 2018-163714 describes a cooler including, within a body, a channel in which coolant flows, and having a battery attached to an upper surface of the body.

SUMMARY

If air bubbles are trapped in coolant, a cooling performance is degraded. Since the air bubbles come into contact with a ceiling of a channel, the cooling performance for an object to be cooled that is attached to an upper surface of a body of a cooler is degraded. The present disclosure provides a technique related to a cooler including a main channel in which an object to be cooled is attached to an upper surface thereof, and a structure which prevents air bubbles from entering the main channel.

A cooler for cooling an object disclosed herein may comprise: a main channel in which coolant flows, wherein the object is attached to an upper surface of the main channel; and a sub channel bypassing the main channel. A ceiling of the sub channel may be higher than a ceiling of the main channel at a branch point between the main channel and the sub channel. Air bubbles trapped in the coolant flow into the sub channel having a higher ceiling height, thus they do not enter the main channel.

A cross-section area of the sub channel may be small, since the sub channel is a channel for the air bubbles to bypass the main channel. In other words, the cross-section area of the sub channel may be smaller than a cross-section area of the main channel. Loss of a cooling performance of the main channel caused by the coolant being distributed to the sub channel may be reduced.

In an area upstream of the branch point with respect to a coolant flow, a height difference between the ceiling of the sub channel and the ceiling of the main channel may gradually increase along a direction of the coolant flow. The air bubbles are smoothly guided to the sub channel.

The technique disclosed herein is in particular suitable for a cooler of which main channel is winding. If the air bubbles enter the winding main channel, the cooling performance may be degraded for a long period of time. Loss of the cooling performance for a long period of time may be avoided by the air bubbles flowing in the bypass channel (the sub channel).

The details and further improvements of the technique disclosed herein will be described in Detailed Description below.

DETAILED DESCRIPTION

Figure 1:
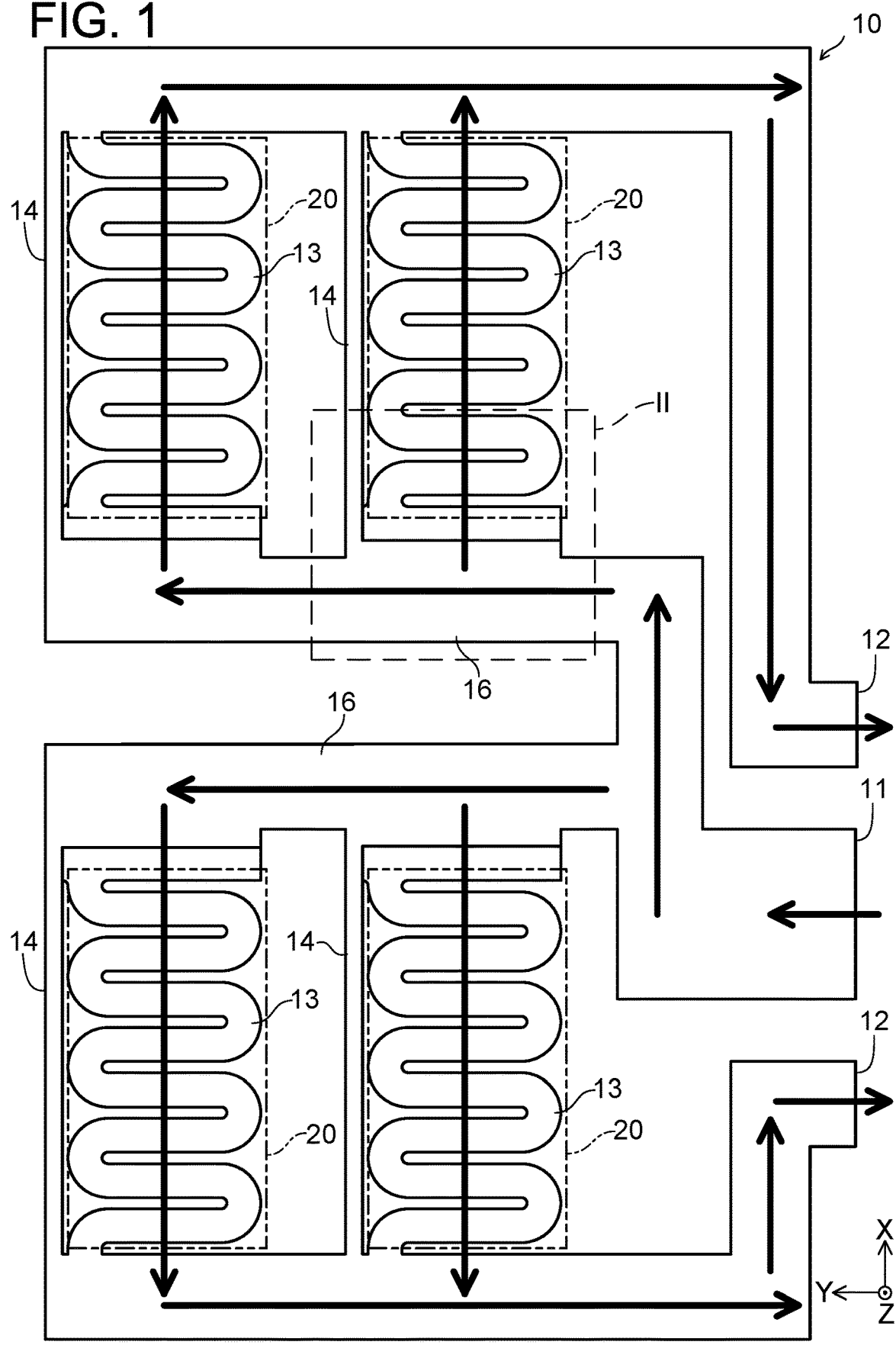
FIG. 1 shows a top view of a cooler 10 of an embodiment.

A cooler 10 of an embodiment will be described with reference to drawings. FIG. 1 shows a top view of the cooler 10. A +Z direction of a coordinate system of the drawings corresponds to an "upward" direction. The cooler 10 includes four main channels 13 and four sub channels 14. Stacks each configured of a plurality of battery cells (stacks 20) are respectively attached to upper surfaces of the main channels 13. The stacks 20 and the cooler 10 are mounted in an electric vehicle. The stacks 20 are configured to collectively output tens of kilowatts of electric power. The stacks 20 generate heat while outputting the electric power and also while being charged. The stacks 20 are objects to be cooled. The cooler 10 is configured to cool the four stacks 20. Thick arrow lines of FIG. 1 illustrate directions of coolant flow. Although main channels 13 to be described later are winding, the thick arrow lines that schematically illustrate the coolant flow are not depicted to conform with windings of the main channels 13.

Each of the main channels 13 is winding in a horizontal direction and thus has a large contact area to be in contact with its corresponding stack 20. Since each contact area is large, the cooler 10 can efficiently cool the stacks 20. The coolant is liquid, and is water or antifreeze liquid.

The cooler 10 includes a supply port 11 and drain ports 12 of the coolant. A circulator of the coolant and a radiator (not shown) are connected to the supply port 11 and the drain ports 12. The coolant supplied from the supply port 11 is distributed to the four main channels 13. For clearer explanation, "main channels" herein refer to parts to which the stacks 20 (objects to be cooled) are attached. Channels from the supply port 11 to respective upstream ends of the main channels 13 are referred to as guide channels 16. Terms "upstream" and "downstream" respectively refer to "upstream" and "downstream" with respect to the coolant flow. In other words, one of opposite ends of each channel closer to the supply port 11 corresponds to "upstream end", and another end closer to the drain port 12 corresponds to "downstream end".

The sub channels 14 respectively extend along the main channels 13. The sub channels 14 are channels bypassing the main channels 13. A cross-section area of each of the sub channel 14 is smaller than a cross-section area of each of the main channels 13, and only a small amount of coolant flows in the sub channels. The channels illustrated as being winding are the main channels 13, and each of the sub channels 14 is connected to an upstream end and a downstream end of its corresponding main channel 13.

The coolant is liquid, thus air bubbles may be trapped therein. If the coolant in which the air bubbles are trapped flows in the main channels 13, the air bubbles come into contact with ceilings of the main channels 13, which degrade a cooling performance for the stacks 20. In particular, the main channels 13 are winding, thus the air bubbles once trapped in the coolant could remain in the main channels 13 for a long period of time, which may degrade the cooling performance. The sub channels 14 prevent the air bubbles from entering the main channels 13.

Figure 2:
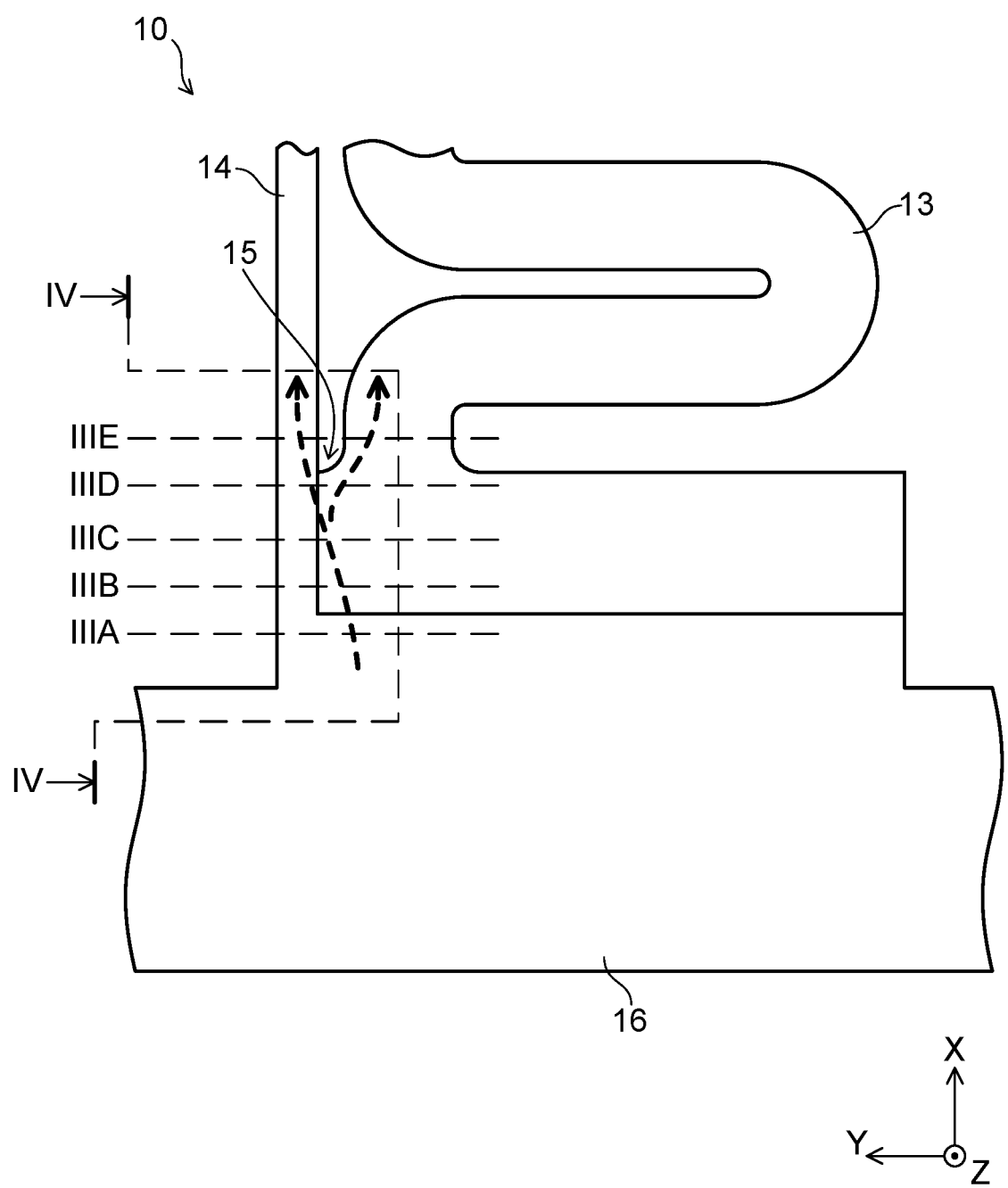
FIG. 2 shows an enlarged view of an area II of FIG. 1.

FIG. 2 shows an enlarged view of an area II of FIG. 1. FIG. 2 is an enlarged view of a vicinity of a branch point 15 between the main channel 13 and the sub channel 14. Thick broken arrow lines illustrate the coolant flow. The branch point 15 is a point where the guide channel 16 is divided into the main channel 13 and the sub channel 14. The coolant and the air bubbles having flown through the guide channel 16 may enter either the main channel 13 or the sub channel 14.

Figure 3A:
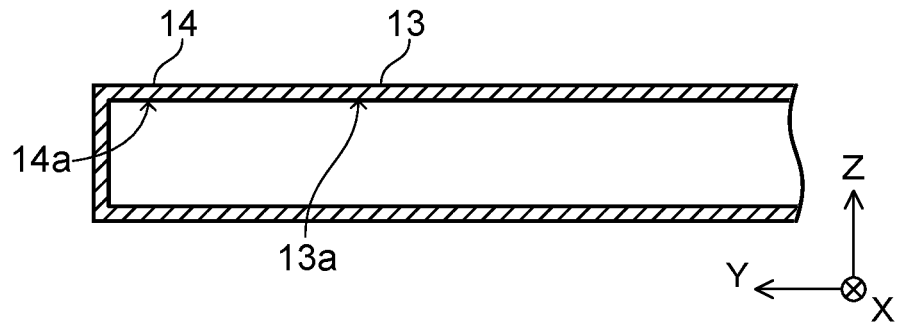
FIG. 3A shows a cross-sectional view taken along a line IIIA of FIG. 2.
Figure 3B:
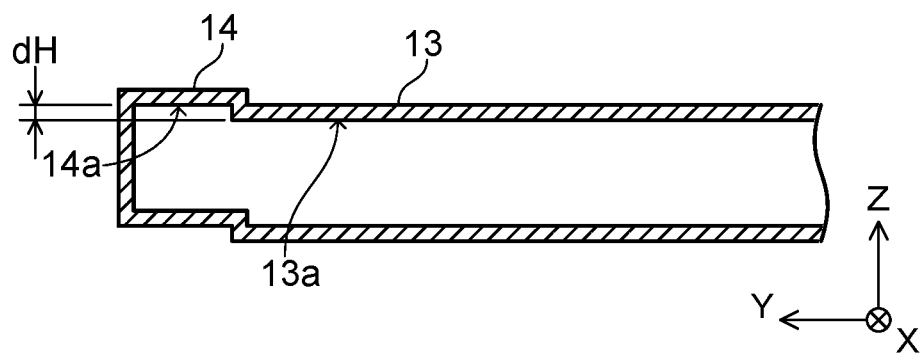
FIG. 3B shows a cross-sectional view taken along a line IIIB of FIG. 2.
Figure 3C:
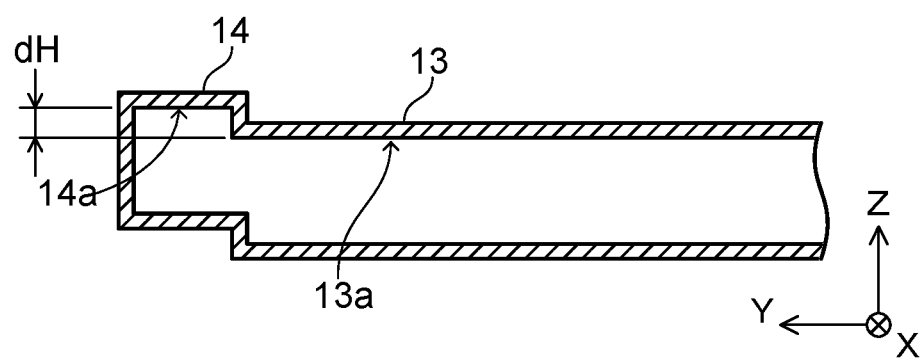
FIG. 3C shows a cross-sectional view taken along a line IIIC of FIG. 2.
Figure 3D:
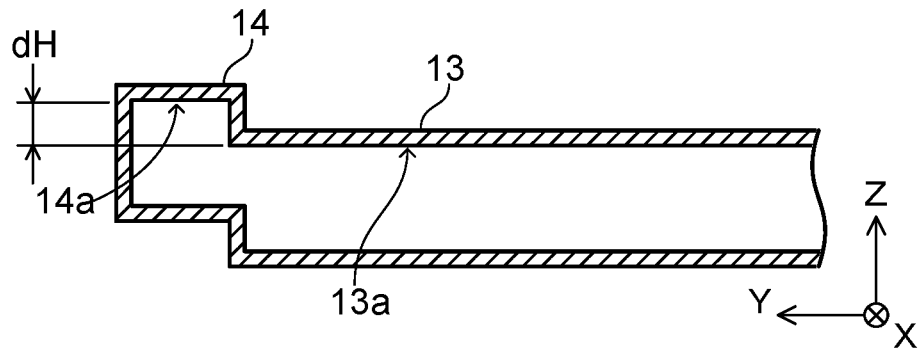
FIG. 3D shows a cross-sectional view taken along a line IIID of FIG. 2.
Figure 3E:
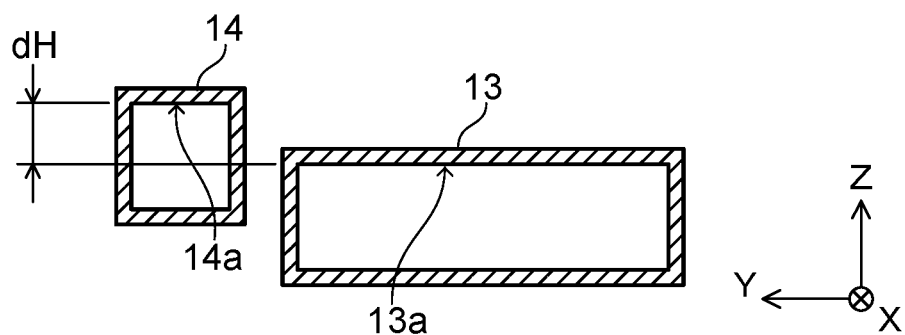
FIG. 3E shows a cross-sectional view taken along a line IIIE of FIG. 2.

FIGS. 3A, 3B, 3C, 3D, and 3E illustrate cross-sections corresponding to broken lines IIIA, IIIB, IIIC, IIID, and IIIE of FIG. 2, respectively. The coolant flows from FIG. 3A to FIG. 3E. FIG. 3A illustrates an area upstream with respect to the coolant flow, and FIG. 3E illustrates an area downstream with respect to the coolant flow. As illustrated in FIGS. 3B to 3E, a ceiling 14a of the sub channel 14 is higher than a ceiling 13a of the main channel 13 at the branch point 15 between the main channel 13 and the sub channel 14. Each distance dH of FIGS. 3B to 3E indicates a height difference between the ceiling 13a of the main channel 13 and the ceiling 14a of the sub channel 14. The height difference dH between the main channel 13 and the sub channel 14 gradually increases from the upstream area to the downstream area.

Figure 4:
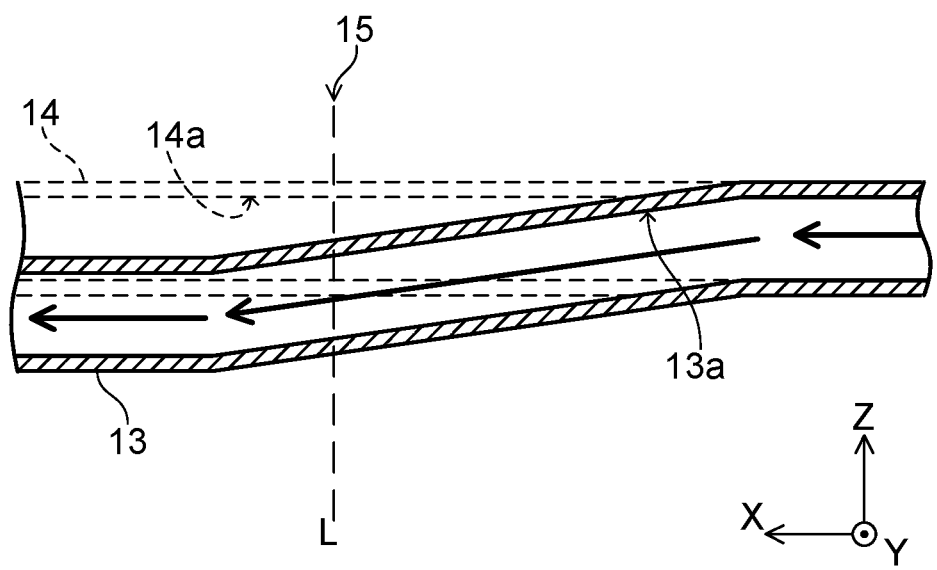
FIG. 4 shows a cross-sectional view taken along a line IV-IV of FIG. 2.

FIG. 4 illustrates a cross-sectional view taken along a line IV-IV of FIG. 2. FIG. 4 illustrates a cross-sectional view of the main channel 13, and illustrates a cross-sectional view of the sub channel 14 in broken lines. Thick arrow lines show the coolant flow. A right portion of FIG. 4 corresponds to the upstream area with respect to the coolant flow, and a left portion of FIG. 4 corresponds to the downstream area with respect to the coolant flow. It is understood from FIG. 4 as well that the height difference between the ceiling 14a of the sub channel 14 and the ceiling 13a of the main channel 13 gradually increases along the direction of the coolant flow.

Due to the height difference between the ceiling 13a of the main channel 13 and the ceiling 14a of the sub channel 14, the air bubbles are guided to the sub channel 14, by which the air bubbles can be prevented from entering the main channel 13.

In FIGS. 3A to 3D, the main channel 13 and the sub channel 14 are not separated from each other. In FIG. 3E, the main channel 13 and the sub channel 14 are separated from each other. FIGS. 3A to 3D illustrate the cross-sectional views in the area upstream of the branch point 15, and FIG. 3E illustrates the cross-sectional view in the area downstream of the branch point 15. In FIG. 4, a broken line L corresponds to the branch point 15. In the cooler 10 disclosed herein, the ceiling 14a of the sub channel 14 is higher than the ceiling 13a of the main channel 13 at the branch point 15 between the main channel 13 and the sub channel 14. It should be noted that the above technically means the following. In the area upstream of the branch point 15 with respect to the coolant flow, the height difference between the ceiling 14a of the sub channel 14 and the ceiling 13a of the main channel 13 gradually increases along the direction of the coolant flow. In the area upstream of the branch point 15 (that is, at a downstream end of the guide channel 16), the ceiling 14a of the sub channel 14 gradually becomes higher than the ceiling 13a of the main channel 13. Due to this configuration, the air bubbles are guided to the sub channel 14.

Points related to the technique described in the embodiment will be described. The cross-section area of each of the sub channels 14 is far smaller than the cross-sectional area of each of the main channels 13. An amount of the coolant flowing in each of the sub channels 14 is smaller than an amount of the coolant flowing in each of the main channels 13. Loss of the cooling performance caused by the coolant flowing in the sub channels 14 may be reduced by minimizing the cross-section areas of the sub channels 14. It is desirable that the sub channels 14 are also respectively in contact with the stacks 20 (objects to be cooled). The coolant flowing in the sub channels 14 also contribute in cooling the objects.

The technique disclosed herein may also be employed to a cooler for cooling object(s) other than the stacks 20.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A cooler for cooling an object, the cooler comprising:
   a main channel in which coolant flows, an upper surface of the main channel configured to attach to the object; and
   a sub channel bypassing the main channel,
   wherein a ceiling of the sub channel is higher than a ceiling of the main channel at a branch point between the main channel and the sub channel, and
   the upper surface of the main channel is disposed above the main channel in a height direction.

2. The cooler of claim 1, wherein a cross-section area of the sub channel is smaller than a cross-section area of the main channel.

3. The cooler of claim 1, wherein in an area upstream of the branch point with respect to a coolant flow, a height difference between the ceiling of the sub channel and the ceiling of the main channel gradually increases along a direction of the coolant flow.

4. The cooler of claim 1, wherein the main channel is winding.

* * * * *